United States Patent [19]

Baumann et al.

[11] 4,441,884
[45] Apr. 10, 1984

[54] QUATERNARY AMMONIUM COMPOUNDS AND THEIR USE AS DYEING ASSISTANTS FOR POLYAMIDE FIBERS

[75] Inventors: Hans-Peter Baumann, Ettingen; Urs Mosimann, Oberwil, both of Switzerland

[73] Assignee: Sandoz Ltd., Basel, Switzerland

[21] Appl. No.: 959,211

[22] Filed: Nov. 9, 1978

Related U.S. Application Data

[63] Continuation-in-part of Ser. No. 856,395, Dec. 1, 1977, abandoned.

[30] Foreign Application Priority Data

Dec. 7, 1976 [CH] Switzerland ............ 15355/76

[51] Int. Cl.³ .................................................. C09B 62/00
[52] U.S. Cl. ............................................ 8/542; 8/455; 8/606; 8/612; 8/924; 564/281; 564/285; 564/292
[58] Field of Search ............ 260/348.13, 348.19, 260/348.44, 567.6 R; 8/31, 606, 612, 542; 564/285

[56] References Cited

U.S. PATENT DOCUMENTS

| | | | |
|---|---|---|---|
| 2,876,217 | 3/1959 | Paschall | 536/50 |
| 2,995,513 | 8/1961 | Paschall et al. | 536/50 |
| 3,652,201 | 3/1972 | Bindler | 8/606 |
| 3,685,953 | 8/1972 | Cuvelier et al. | 8/606 |
| 3,737,406 | 6/1973 | D'Alelio | 528/51 |
| 3,853,460 | 12/1974 | Balland | 8/541 |
| 3,988,111 | 10/1976 | Balland | 8/541 |
| 4,035,145 | 7/1977 | Gipp et al. | 8/606 |
| 4,090,845 | 5/1978 | Petzold et al. | 8/606 |
| 4,149,849 | 4/1979 | Koch et al. | 8/574 |

FOREIGN PATENT DOCUMENTS

| | | |
|---|---|---|
| 2117182 | 10/1972 | Fed. Rep. of Germany. |
| 39-5985 | 4/1964 | Japan. |
| 7006834 | 11/1970 | Netherlands. |
| 1352205 | 5/1974 | United Kingdom. |

*Primary Examiner*—A. Lionel Clingman
*Attorney, Agent, or Firm*—Gerald D. Sharkin; Richard E. Vila; Thomas C. Doyle

[57] ABSTRACT

The present invention relates to a process for treating a polyamide textile substrate to increase the affinity thereof for anionic dyes or to reserve the same against cationic dyes comprising applying thereto, in a weakly alkaline medium, a compound of formula I,

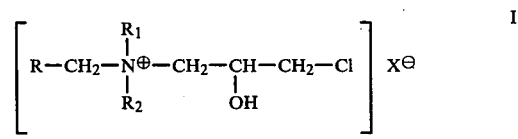

wherein
R is phenyl; naphthyl; $(C_{5-6})$cycloalkyl; or phenyl or naphthyl substituted by a total of up to 3 substituents selected from the group consisting of $(C_{1-4})$alkyl, chlorine and bromine (maximum of two of each of these);
each of $R_1$ and $R_2$, independently, is $(C_{1-4})$alkyl, and $X^\ominus$ is a non-chromophoric anion.

17 Claims, No Drawings

QUATERNARY AMMONIUM COMPOUNDS AND THEIR USE AS DYEING ASSISTANTS FOR POLYAMIDE FIBERS

This is a continuation-in-part of copending application Ser. No. 856,395, filed Dec. 1, 1977 and now abandoned.

The present invention relates to a treatment process for polyamide fibres.

More particularly, the present invention provides a process for treating a polyamide textile substrate to increase the affinity thereof for anionic dyes or to reserve same against cationic dyes, comprising applying thereto, in a weakly alkaline medium, a compound of formula I,

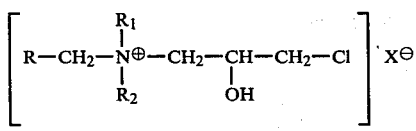

wherein

R is phenyl; naphthyl; $(C_{5-6})$cycloalkyl; or phenyl or naphthyl substituted by a total of up to 3 substituents selected from the group consisting of $(C_{1-4})$alkyl, chlorine and bromine (maximum of two of each of these);

each of $R_1$ and $R_2$, independently, is $(C_{1-4})$alkyl, and $X^\ominus$ is a non-chromophoric anion.

In the compounds of formula I, R is preferably phenyl, tolyl, xylyl, naphthyl, naphthyl monosubstituted by methyl or chlorine, cyclopentyl or cyclohexyl, more preferably phenyl, naphthyl or cyclohexyl with phenyl being especially preferred.

Preferably each of $R_1$ and $R_2$, independently, is methyl or ethyl, more preferably both of $R_1$ and $R_2$ are methyl.

The exact nature of $X^\ominus$, provided it is non-chromophoric, is not critical. $X^\ominus$ is preferably $Cl^\ominus$, $Br^\ominus$, $I^\ominus$ or $CH_3SO_4^\ominus$, more preferably $Cl^\ominus$ or $Br^\ominus$.

The compounds of formula I also form part of the present invention. Preferred compounds of formula I are those in which R is phenyl, naphthyl or cyclohexyl, $R_1$ and $R_2$ are both methyl and $X^\ominus$ is a non-chromophoric anion, preferably $Cl^\ominus$, $Br^\ominus$, $I^\ominus$ or $CH_3SO_4^\ominus$, more preferably $Cl^\ominus$ or $Br^\ominus$.

Representative compounds of formula I are those of formulae II, III, IV and V,

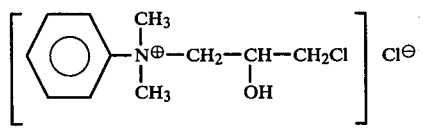

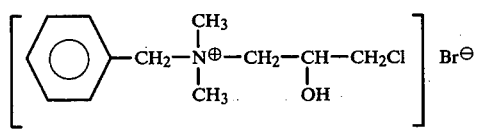

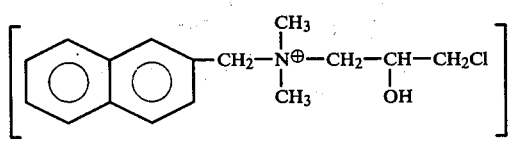

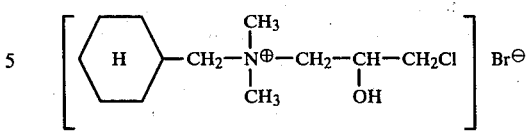

The compounds of formula I may be prepared in accordance with known methods from available starting materials, for example by methods analogous to those described in U.S. Pat. Nos. 2,876,217 and 2,995,513.

The compounds of formula I may be applied to the polyamide substrate by known methods, for example by printing with pastes containing a compound of formula I, spraying or sprinkling the fibres with solutions containing a compound of formula I, or by treating the substrate in a bath containing a compound of formula I in solution, e.g. by the exhaust method.

The amount of compound of formula I in the pastes or solutions is preferably in the range of from 0.1% to 5%, by weight based on total weight of paste or solution, more preferably from 0.2% to 5%, even more preferably from 0.2% to 4%, with from 0.5% to 4% being especially preferred.

The process of the present invention is carried out in a weakly alkaline medium i.e. a medium having a pH value of from 7 to 10, preferably in a medium having a pH value in the range of from 7.2 to 9. The weakly alkaline medium is preferably obtained by adding a weakly alkaline salt such as for example sodium bicarbonate, preferably in an amount of from 0.1 to 2%, more preferably from 0.5 to 2%, by weight, based on the total weight of the paste or solution. The paste or solution may also contain sodium sulphate in addition to the weakly alkaline salt. Conveniently, the pastes or solutions contain from up to 10%, more preferably from 0.5 to 10%, most preferably 1 to 5% by weight based on the weight of the paste or solution of such sodium sulphate.

It is preferred to carry out a fixation step after the treatment process. Fixation may be accomplished by any of the known methods, for example by treating the substrate in saturated steam for a period of from 2 to 10 minutes, treating it with hot air for about 1 minute, or storing the substrate at room temperature for one or two days.

The compounds of formula I may be made up into pastes and solutions in accordance with known methods, for example pastes by mixing with the usual additives such as stabilizers, thickeners etc.

The substrate to be treated may be of natural or synthetic polyamide, for example wool, silk, Nylon 6, Nylon 66 and Nylon 11 and may be in fibre, fabric or yarn form. The polyamide may, of course, be in blend form, such blend preferably containing at least 50% by weight of polyamides.

The preferred process according to the invention comprises applying a paste containing a compound of formula I by a printing process, followed by fixation.

The process according to the present invention enhances the affinity of the polyamide substrate for anionic dyes and reserves the substrate against cationic dyes. The term anionic dye is to be understood to include anionic optical brighteners as well as dyestuffs.

By the process of the invention, as well as increasing depth of dyeing with anionic dyes, interesting effects can also be obtained. Thus where the substrate has been treated in local areas, e.g. in pattern form, with a compound of formula I, and is subsequently dyed or printed with an anionic dye, those areas to which both dye and compound of formula I have been applied will be of a greater depth of shade than the areas to which only the dye has been applied. The reverse effect is, of course, observed where a cationic dye is employed. As will be appreciated, combination dyeings employing both cationic and anionic dyestuffs lead to combined, more complex shade possibilities, e.g. where the two types of dyes are of different colour, which possibilities can be further enhanced by applying a reserving agent to anionic dyes in local areas. The treatment of the substrate with the compounds of formula I has no effect on the affinity of the substrate for disperse dyes and accordingly still further effects, as desired, can be achieved by additional dyeing with a disperse dye or dyes, e.g. to give a ground colour.

Furthermore, dyeings made with anionic dyes on polyamide fibres treated in accordance with the process of the present invention possess improved wet-fastness.

The polyamides treated in accordance with the present invention may be dyed or printed in accordance with known methods, for example by exhaust dyeing, pad dyeing or one of the many printing techniques.

The following Examples further serve to illustrate the invention. In the Examples all parts and percentages are by weight and degrees are degrees Centigrade.

EXAMPLE 1

Two pastes are made up with the following constituents:

5 parts of the compound of formula III, for the first paste, and 30 parts of the compound of formula III for the second paste, 5–10 parts of sodium bicarbonate, 5 parts of tert.-octylphenyl-poly(4-5)-glycol ether, 5 parts of sodium lauryl alcohol diglycol ether sulphate, and 400 parts of 8% sodium alginate solution, both pastes being made up to a total of 1000 parts with water.

With these pastes 3.5 cm wide strips on Helanca tricot nylon-66 fabric, each separated from the next by 2.5 cm, are printed. The strips are then steamed for 10 minutes in saturated steam at 100°–102°, rinsed and dried. The fabrics with the printed strips are then dyed each with one of the following anionic dyestuffs:

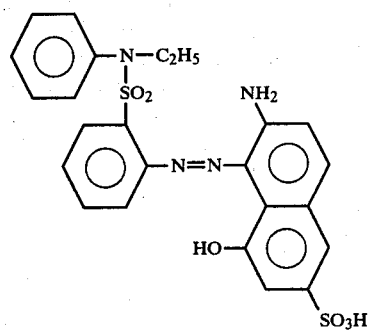

(a)

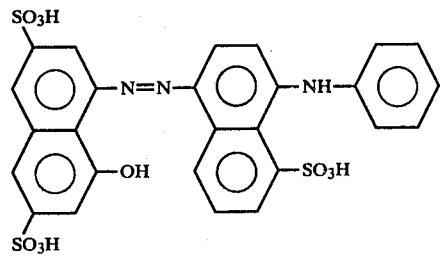

(b)

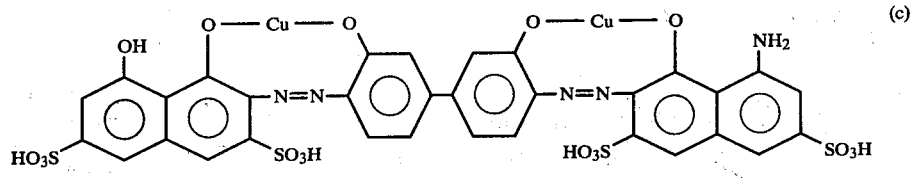

(c)

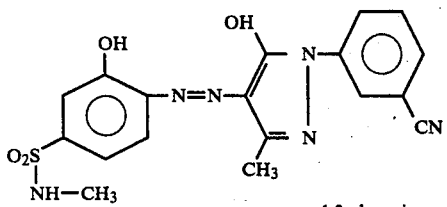

1:2 chromium complex

In each case, 0.3% by weight of the dyestuff is used, and the dyeing is effected for 60 minutes at 98° at a goods: liquor ratio of 1:50. Dyeings with dyestuffs (a), (b) and (c) are carried out in the presence of 2% acetic acid and with dyestuff (d) in the presence of 4% ammonium sulphate. The material dyed with dyestuff (a) is red, with dyestuff (b) blue, with dyestuff (c) greenish-blue and with dyestuff (d) yellowish-red. It is observed that the pre-printed strips are dyed to a greater depth of shade than the un-printed strips. The strips pre-treated with 30 parts of the compound of formula III are of a significantly greater depth of shade than those pre-treated with 5 parts of the compound of formula III.

When the above described process is repeated using the compound of formula II, similarly good results are obtained.

EXAMPLE 2

Two pastes are made up with the following constituents:
20 parts of the compound of formula II in the case of the first paste, and
20 parts of the compound of formula III in the case of the second paste,
5-10 parts sodium bicarbonate,
5 parts of tert.-octylphenyl poly(4-5)-glycol ether,
300 parts 4% sodium alginate solution
and water to make up a total weight of 1000 parts.
The pastes are homogenised by vigorous stirring.

With these pastes, knitted articles and woven fabrics of nylon-6 and -66, are printed by the screen printing process. A part of the prints is stored for 2 days at room temperature and then rinsed with water, while the remaining part is steamed for 5 minutes in saturated steam at 101°-103° and then rinsed with water.

The parts of the prints obtained in this way are dyed with the following dyestuffs by a conventional exhaust dyeing procedure:

Acid Yellow 19, Acid Yellow 25, Acid Yellow 127, Acid Orange 3, Acid Orange 19, Acid Orange 43, Acid Red 57, Acid Red 145, Acid Red 151, Acid Blue 23, Acid Blue 25, Acid Blue 40, Acid Blue 52, Acid Blue 80, Acid Blue 92, Acid Blue 268.

The following results were obtained for all of the dyeings:

The treated portions are dyed with a greater depth of shade than the untreated portions. The patterns are clearly visible.

Comparable results are obtained when the dyeing is effected according to the continuous dyeing method, e.g. the padding method, instead of the exhaust method.

The printed patterns are maintained even after several hours dyeing at boiling temperature.

If such prints are subjected to a strong water fastness test (SNV 195819) it can be established that the fastness of the treated portions is surprisingly good relative to the depth of dyeing. For example, the treated portions which have been dyed approximately twice as deeply as the lighter un-treated portions with Acid Red 57 or Acid Blue 40 are more-or-less as fast as the lighter portions. If the same printing pattern is produced by a normal screen printing process, the dark portions would be significantly less fast than portions dyed as described in this example.

EXAMPLE 3

The procedure described in Example 2 is repeated using the described pastes and also a further one of the following composition:
20 parts of 2,4-dichloro-6-phenylamino-1,3,5-triazine-4'-sulphonic acid,
20 parts of disodium hydrogen phosphate,
5 parts of tert.-octylphenyl poly-(4-5)-glycol ether,
300 parts of 4% sodium alginate solution,
and water to make up a total weight of 1000 parts.

With subsequent dyeing the following results are observed:

Dyeing with an anionic dyestuff, the portions of the fabric treated with the compounds of formula II and III are significantly more deeply dyed, and the portions treated with 2,4-dichloro-6-phenylamino-1,3,5-triazine-4'-sulphonic acid are significantly more weakly dyed than the untreated portions. When cationic dyestuffs are used, the picture is reversed. (With disperse dyestuffs no effect is shown with this treatment). A large variety of shades and depth of shades can be obtained when such pre-treated material is dyed. For example:

(a) On dyeing with 0.5% Acid Blue 92 dark blue, light blue and white portions are obtained.

(b) On dyeing with 0.5% Acid Blue 92 and 0.2% Disperse Yellow 50, blueish-green, green and yellow portions are obtained.

(c) On dyeing with 0.5% Acid Blue 92 and 0.2% Basic Orange 37, dark blue, medium blue and gold-yellow portions are obtained.

EXAMPLE 4

Texturised Nylon 66 and Nylon 6 carpet yarn are printed with a paste of the following composition by the warp printing method (take-up of 100% on the printed portions)

1st Printing Roll:
400 parts of 4% sodium alginate solution,
20 parts of sodium bicarbonate,
25 parts of sodium sulphate,
15 parts of the compound of formula III,
1 part of tert.-octylphenyl poly(4-5)glycol ether
and 539 parts of water.

2nd Printing Roll:
Composition as for 1st printing roll except that 3.75 parts of the compound of formula III are used.

The printing by the second printing roll crosses that of the first printing roll. The printed material is steamed in saturated steam at 102°–103° for 4 minutes and then rinsed with water.

The yarn treated as described above is tufted on jute fabric, and samples of the resulting carpet are dyed by the exhaust method. Using Acid Yellow 25, Acid Red 57 and Acid Blue 72 dyestuffs, the following shades are obtained: beige, grey, red, blue and olive. All the carpet samples display the so-called "space dyed effect".

EXAMPLE 5

The procedure of Example 4 is repeated but replacing the paste of the 2nd printing roll with the following composition:
400 parts of 4% sodium alginate solution,
30 parts of 2,4-dichloro-6-phenylamino-1,3,5-triazine-4'-sulphonic acid,
20 parts of disodium phosphate,
1 part of tert.-octylphenyl poly(4-5)glycol ether
and 544 parts of water.

The treated material is steamed in saturated steam at 102°–103° for 7 minutes and then rinsed with water. After subsequent dyeing the following four levels of affinity are to be seen:

| Portions of the carpet printed with | Dye Affinity in comparison with the unprinted portions | |
|---|---|---|
| | Anionic dyestuffs | Cationic dyestuffs |
| 1st printing roll | markedly increased | decreased |
| 2nd printing roll | markedly decreased | markedly increased |
| overlapping portions of the first and second printing roll | decreased | increased |

When the dyeing is effected with 0.5% Acid Blue 92 and 0.3% Basic Orange 37, dark blue, medium blue, bright yellow and gold-yellow portions are observed. By selecting the dyestuffs a multitude of different shades can be achieved.

EXAMPLE 6

Combed wool is printed by the Vigoureux method with pastes of the following composition:
20 parts of the compound of formula II for the first paste, and
20 parts of the compound of formula III for the second paste,
5 parts of tert.-octylphenyl poly(4-5)glycol ether,
5 parts of sodium bicarbonate, 250 parts of 4% alginate thickener,
and 720 parts of water.
Both pastes are homogenised by thorough stirring.

The weight increase on the printed portions is 100%. After the combed wool has been steamed in saturated steam at 102°, rinsed and dried, it is converted into yarn. When the yarn is dyed conventionally by the exhaust method, dyed fabres of various depths are observed. For example, when 1% of the dyestuff of formula

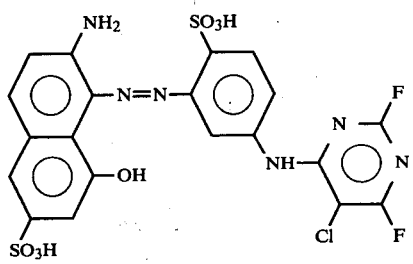

(e)

together with 1% of alkoxylated and sulphated N-aminopropyl tallow fatty acid amine is used, light and dark red fibres are observed.

EXAMPLE 7

50 parts of Nylon-6, -66 and -11, wool and silk in the form of flocks or yarn are treated in each case with 1 part of the compound of formula II or III dissolved in 1000 parts of water. The cold treatment bath is heated to boiling point over a period of 30 minutes and the treatment at boiling point is continued for a further 30 minutes. The material sample is then removed from the bath, rinsed with water and dried, whereafter it is processed together with the corresponding untreated material to yarn or twisted yarn.

After dyeing with an anionic dyestuff each material sample displays darker and lighter parts, the former being attributed to the pre-dyeing treatment.

EXAMPLE 8

Nylon-6 and Nylon-66 pullovers are in each case irregularly sprayed with 1% solutions of the compounds of formulae II and III, which solutions further contain 1% of sodium bicarbonate. The pullovers are stored for a day at room temperature and then rinsed with water, whereafter they are dyed by the exhaust dyeing method with Acid Blue 92, Acid Red 145 and Direct Green 28.

It is observed that the treated portions are significantly more deeply dyed than the untreated portions.

EXAMPLE 9

Nylon-66 satin is printed by the screen printing process with a paste of the following composition: (100% increase in weight of treated portions)
300 parts of 3% alginate solution,
10 parts of the compound of formula II,
1 part of tert.-octylphenyl poly(4-5)glycol ether,
and 689 parts of water.
The paste is intensively rubbed to achieve homogeneity.

The printed material is dried, fixed in a hot air current at 160° for 60 seconds and then rinsed.

Pieces of the material are than dyed with various combinations of anionic dyestuffs. The printing pattern is observed to be very clear in that the treated portions are significantly more deeply dyed than the untreated portions.

The compound of formula II may be prepared mixing 448 g N-benzyldimethylamine in 118 g water and neutralizing the same with 369.5 g hydrochloric acid. 304.8 g epichlorohydrin are added dropwise thereto at 50° C. After the exothermic reaction is complete the reaction mixture is heated to 90° C. and stirred at this temperature for 45 minutes, the water is distilled off and the product which is a white powder is dried.

What is claimed is:

1. A process for treating a polyamide textile substrate to increase the affinity thereof for anionic dyes or to reserve the same against cationic dyes comprising applying thereto, in a weakly alkaline medium, a compound of formula I,

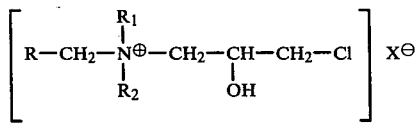

wherein
R is phenyl; naphthyl; (C$_{5-6}$)cycloalkyl; or phenyl or naphthyl substituted by a total of up to 3 substituents selected from the group consisting of (C$_{1-4}$)alkyl, chlorine and bromine (maximum of two of each of these);
each of R$_1$ and R$_2$, independently, is (C$_{1-4}$)alkyl, and X$^{\ominus}$ is a non-chromophoric anion.

2. A process according to claim 1, wherein R is phenyl, tolyl, xylyl, naphthyl, naphthyl monosubstituted by methyl or chlorine, cyclopentyl or cyclohexyl.

3. A process according to claim 2, in which each of R$_1$ and R$_2$, independently, is methyl or ethyl.

4. A process according to claim 1, in which X$^{\ominus}$ is Cl$^{\ominus}$, Br$^{\ominus}$, I$^{\ominus}$, or CH$_3$SO$_4^{\ominus}$.

5. A process according to claim 2, in which R is phenyl, naphthyl or cyclohexyl.

6. A process according to claim 1, in which a subsequent fixation step is carried out.

7. A process according to claim 1, in which the compound of formula I is applied to the substrate in a solution or paste.

8. A process according to claim 7, in which the paste or solution contains a compound of formula I in the range of from 0.1 to 5% by weight, based on the total weight of the paste or solution.

9. A process according to claim 7, in which the paste of solution contains a weakly alkaline salt in an amount of form 0.1 to 2% by weight, based on the weight of the paste or solution.

10. A process according to claim 1, in which the substrate is subsequently dyed or printed with an anionic dye or a mixture of anionic and cationic dyes.

11. A process according to claim 3 in which R is phenyl, naphthyl or cyclohexyl.

12. A process according to claim 3 in which R is phenyl and R$_1$ and R$_2$ are methyl.

13. A process according to claim 8 wherein the paste or solution has a pH of 7 to 10.

14. A process according to claim 13 wherein a fixation step is carried out following the application of the compound of formula I to the substrate.

15. A process according to claim 14 wherein, following application of the compound of formula I and the fixation step, there is applied to the treated substrate an anionic or cationic dyestuff or a mixture of such dyestuffs.

16. A process according to claim 15 wherein, in the compound of formula I, R is phenyl, naphthyl or cyclohexyl and R$_1$ and R$_2$ are, independently, methyl or ethyl.

17. A process according to claim 16 wherein R is phenyl and R$_1$ and R$_2$ are methyl.